United States Patent [19]

Louboutin

[11] 4,111,802

[45] Sep. 5, 1978

[54] WATER TREATMENT APPARATUS AND METHOD

[75] Inventor: Robert Louboutin, Crespieres, France

[73] Assignee: Societe Degremont, Rueil-Malmaison, France

[21] Appl. No.: 773,555

[22] Filed: Mar. 2, 1977

[30] Foreign Application Priority Data

Mar. 24, 1976 [FR] France .................... 76 08442

[51] Int. Cl.$^2$ .................... B01D 21/16; C02B 1/22
[52] U.S. Cl. .................... 210/46; 210/49; 210/195 S; 210/208
[58] Field of Search .............. 210/46, 49, 195 S, 205, 210/207, 208

[56] References Cited

U.S. PATENT DOCUMENTS

| 2,215,185 | 9/1940 | Lund | 210/46 |
| 2,348,124 | 5/1944 | Green | 210/46 |
| 3,015,621 | 1/1962 | Quast | 210/205 |
| 3,300,047 | 1/1967 | Hirsch | 210/208 X |
| 3,320,161 | 5/1967 | Lapaix | 210/46 |
| 3,397,788 | 8/1968 | Duff et al. | 210/208 X |

Primary Examiner—Thomas G. Wyse
Attorney, Agent, or Firm—Wenderoth, Lind & Ponack

[57] ABSTRACT

A single enclosure includes a reaction zone and a decanting zone. Water to be treated is introduced into the bottom of the reaction zone. A pump turbulently mixes the water and sludge within a turbulent area of the reaction zone and passes the resultant mixture through a central passage at a rate several times higher than the rate at which the water is introduced into the reaction zone. A first portion of the mixture is recycled back into the turbulent area. A second portion of the mixture, including a relatively high concentration of sludge, is distributed to the bottom of the decanting zone, at a flow rate and at a pressure sufficient to ensure that the mixture of sludge and water will be distributed uniformly throughout the entire area of the lower portion of the decanting zone. The purified water passes upwardly through the decanting zone and is collected. The sludge settles downwardly to the bottom of the decanting zone and is returned to the turbulent area of the reaction zone.

44 Claims, 6 Drawing Figures

WATER TREATMENT APPARATUS AND METHOD

BACKGROUND OF THE INVENTION

The present invention is directed to a method and apparatus for treating water by flocculation and/or crystalline-precipitation type treatments. The present invention is particularly directed to such a method and apparatus wherein sludge is recycled and wherein a mixture of water to be treated, sludge and possibly chemical reagents are passed into a decanter. The method and apparatus of the present invention are particularly useful when employing decanting of the laminar type. The method and apparatus of the present invention are additionally particularly suitable for treating water which is charged or saturated with inorganic salts that can be precipitated therefrom in the form of a crystalline sludge by means of known chemical reagents with which they form compounds of low solubility. Such known reagents may for example be lime, soda, baryta, and other known such crystalline-precipitation compounds.

It is known that the inner recycling of sludge strongly accelerates the flocculation and/or crystalline-precipitation process. There are known various installations, generally referred to as solids contact units including a central area wherein mixing and reaction are performed in the presence of sludge. Such units include a decanting area, and the mixture is passed from the central area into the decanting area. Such known devices normally include a central reaction zone and a surrounding annular decanting or clarification zone.

It is further known in such installations that the use of parallel inclined plates, for example inclined at an angle of approximately 60° C. to the horizontal, within the decanting zone achieves an efficient laminar decanting with increased velocities.

However, such previously known installations generally suffer from the following specific operational disadvantages.

Generally, it is difficult to economically arrange a set of parallel inclined plates within an annular area without wasting a portion of the surface area of the decanting zone. This difficulty has to some degree been overcome by placing a circular reaction zone within a rectangular decanting zone, and the sludge which settles in the bottom of the decanting zone is returned to the central reaction zone. However, in such an arrangement sludge would tend to settle in corners and could not be removed therefrom. To overcome this disadvantage it has been necessary to form the decanting zone to include a lower circular area and an upper rectangular area. However, the structural complexities of such a system should be readily apparent.

Additionally, it is known that when the water is being treated by a crystalline-precipitation treatment, and when such treatment is performed in a sufficiently concentrated sludge medium, precipitation takes place on the sludge, the sludge thus attracting the crystalline precipitates. That is, it is known that sludge must be present in sufficient quantities to avoid separate precipitation of the crystals. Such separate precipitation of the crystals would lead to rapid incrustation of the inner elements of the installation. In known systems wherein the reaction zone is located centrally within a decanting area, the concentration of sludge normally decreases from the center towards the periphery of the installation. If the precipitation reaction is not ended when the mixture passes from the reaction zone to the decanting zone, the precipitation reaction is continued within the decanting zone, and if the concentration of sludge at certain areas therein is insufficient, a very rapid and progressive incrustation of the plates within the decanting zone will occur. Such incrustation is magnified due to the fact that the incrustations retard the descending flow of sludge between the inclined parallel plates. Thus, there may rapidly occur inequalities in the spacing between adjacent plates, thereby manifestly rendering the operation of the decanter inefficient.

Further, in such known installations, wherein the mixture is distributed in a radial direction from the reaction zone to the decanting zone, it is substantially impossible to achieve an actual uniform distribution of the mixture throughout the entire area of the decanting zone.

In installations of this type, distribution of the mixture from the reaction zone to the decanting zone is achieved by a pressure drop across the distribution system, i.e. normally across a plurality of openings which feed into the decanting zone. In known installations however, it is possible to achieve a reasonably uniform distribution throughout the entire area of the decanting zone only when operating the installation at approximately the designed nominal flow rate of the installation. That is, if the installation is operated at a substantially reduced rate, it is difficult to achieve or maintain satisfactory fluid pressures within the system to provide a uniform distribution throughout the area of the decanting zone. More paraticularly, an installation must be designed such that when it operates at the designed nominal flow rate the velocity of mixture entering the decanting zone must be maintained at a level sufficiently low to avoid any turbulence within the decanting zone. For example, it is generally considered that the velocity of mixture actually entering a decanting zone may not exceed approximately 1.4 meters per second. This velocity would correspond essentially to a pressure drop across a distribution system of 10 centimeters of water. This would generally be sufficient to provide a uniform distribution throughout the area of the decanting zone. However, if it becomes necessary to operate such an installation at half the designed nominal flow rate, then the pressure drop across the distribution system into the decanting zone would be only approximately 2.5 centimeters of water. Such a pressure drop is clearly insufficient to achieve a uniform distribution of the mixture throughout the area of the decanting zone.

SUMMARY OF THE INVENTION

With the above discussion in mind, it is an object of the present invention to provide a method and apparatus of the general type discussed above, but which overcomes the above discussed disadvantages.

Specifically, it is an object of the present invention to provide a water treatment method and apparatus wherein it is possible to achieve thorough mixing of liquid to be treated, such as raw water, possible chemical precipitation reagents, and sludge within a reaction zone and to then distribute the resultant mixture throughout the entire area of an adjacent decanting zone, even when the installation is operated at rates substantially below the designed nominal flow rate.

It is specifically an object of the present invention to provide such a method and apparatus whereby, even when the installation is operated at less than the designed nominal flow rate thereof, it is possible to always achieve a uniform distribution at a desired uniform rate of flow of a mixture including a desired sludge concentration throughout all bottom areas of a decanting zone.

These objects are achieved in accordance with the present invention by the provision of a system wherein a single enclosure includes therein at least one reaction zone having therein sludge and at least one decanting zone. Liquid to be treated, such as raw water, is introduced into the bottom of the reaction zone. The liquid to be treated may be mixed with suitable precipitation reagents, either before or after entry into the bottom of the reaction zone.

The reaction zone includes a pump for turbulently mixing the liquid, precipitation reagents and sludge within a turbulent area of the reaction zone and withdrawing the resultant mixture upwardly through a central passage at a controlled desired rate of flow which may be several times the designed nominal rate of flow of the installation and several times the actual rate of introduction of liquid into the reaction zone. A portion of the withdrawn mixture is returned to the turbulent area via adjustable openings to thereby increase the turbulence created in the turbulent area and also to thereby increase the sludge concentration of the mixture. The remainder of the withdrawn mixture is passed to the decanting zone at a uniform flow rate and with a desired sludge concentration to achieve a uniform distribution of the mixture throughout the entire bottom area of the decanting zone. The purified water rises upwardly through the top of the decanting zone, and sludge settles downwardly toward the bottom of the decanting zone. A system such as an endless conveyor having scraper blades thereon returns the settled sludge from the bottom of the decanting zone into the turbulent area of the reaction zone to thereby increase the sludge concentration of the mixture being formed.

The inventive concept of the present invention is particularly advantageous when used in a decanting zone having therein inclined parallel plates. This is due to the fact that in accordance with the present invention it is possible to maintain a desired sludge concentration of the mixture introduced into the decanting zone, and it is possible to ensure that this desired concentration of sludge is introduced throughout the entire bottom area of the decanting zone in a uniform manner. Therefore, it is possible to avoid any incrustation of the crystalline precipitate on the plates.

In a specific preferred embodiment of the present invention, the decanting zone extends longitudinally from the reaction zone. It is thereby possible to provide ducts along opposite lateral sides of the decanting zone. The mixture is passed from the reaction zone through these ducts. Orifices extend from the ducts into the bottom of the decanting zone, on opposite lateral sides thereof. These orifices are spaced along the entire length of the decanting zone. Thus, it is possible to very accurately ensure that the water and sludge mixture is uniformly distributed throughout the entire bottom area of the decanting zone.

Due to the arrangement of the pump in the reaction zone in accordance with the present invention, even if a given installation is operated at substantially less than the designed nominal flow rate, it is possible to ensure that the mixture introduced into the decanting zone is maintained at sufficient quantities, at a sufficient rate of flow, and at sufficient fluid pressures to ensure that the mixture is distributed completely uniformly throughout the bottom area of the entire decanting zone.

It is also possible in accordance with the present invention to provide that the bottom floor of the decanting zone slopes toward the reaction zone at an inclination sufficient to return settled sludge from the decanting zone to the reaction zone, even without the provision of a scraping device.

BRIEF DESCRIPTION OF THE DRAWINGS

Other objects, features and advantages of the present invention will be apparent from the following detailed description taken with the accompanying drawings, wherein.

DETAILED DESCRIPTION OF THE INVENTION

Figure 2:
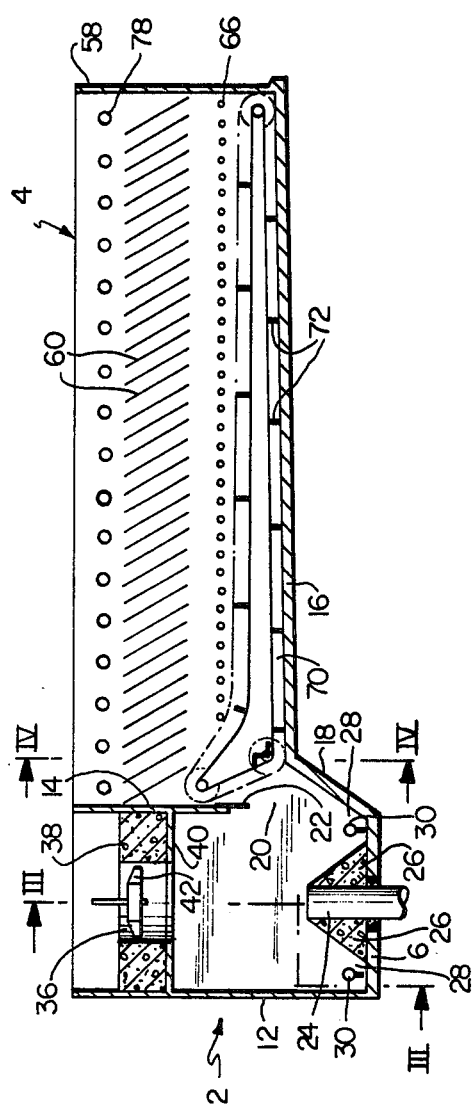
FIG. 2 is a cross-sectional view taken along line II—II of FIG. 1.

The following detailed description will be made of a water treatment apparatus employing a substantially rectangular decanting or claffication zone located adjacent one side of a substantially rectangular reaction zone. It is however to be understood that the most basic concept of the present invention involves the distribution of the water to be treated in a uniform manner and at a uniform rate throughout the entire surface area of the decanting or clarification zone, and that this specific inventive concept is applicable to water treatment apparatus of other construction.

Furthermore, the following description specifically relates to a water treatment apparatus wherein the decanting or clarification zone has therein parallel plates to facilitate laminar decanting or clarification, inasmuch as the inventive concept of uniform distribution of the liquid to be treated is particularly advantageous in achieving uniform feed into all of the spaces between the plates. However, it is to be understood that the concept of the present invention is applicable to water treatment apparatus which do not include parallel plates in the decanting or clarification zone.

With reference now to the drawings, and particularly to FIGS. 1–4 thereof, a specific preferred embodiment of the present invention will be described in detail.

The water treatment apparatus includes a reaction zone, generally indicated by reference numeral 2, and a decanting or clarification zone, generally indicated by reference numeral 4.

Reaction zone 2 is generally rectangular in horizontal cross-section, and includes a lower area defined by a base 6, side walls 8 and 10, and an end wall 12 spaced from decanting zone 4. The upper portion of reaction zone 2 is separated from decanting zone 4 by an end wall 14. Base 6 of reaction zone 2 is joined to base 16 of decanting zone 4 by an inclined wall 18. The lower portion of reaction zone 2 communicates with the decanting zone 4 via an opening 20 defined between end wall 14 and inclined wall 18. Opening 20 extends transversely across the entire width of the lower portion of reaction zone 2. An adjustment baffle or plate 22 may be provided to adjust the size of opening 20.

Means, such as raw water inlet pipe 24, extends through the bottom of base 6 to introduce raw water to be treated into the bottom of reaction zone 2. A fill material, such as concrete block 26, is positioned within the bottom of reaction zone 2 and extends transversely across the entire width thereof. Block 26 extends from the outlet end of inlet pipe 24 and tapers downwardly to form two substantially V-shaped troughs 28 which extend transversely across the width of reaction zone 2. Concentrated sludge which collects within troughs 28 may be periodically withdrawn therefrom by longitudinal withdrawal pipes 30.

Figure 3:
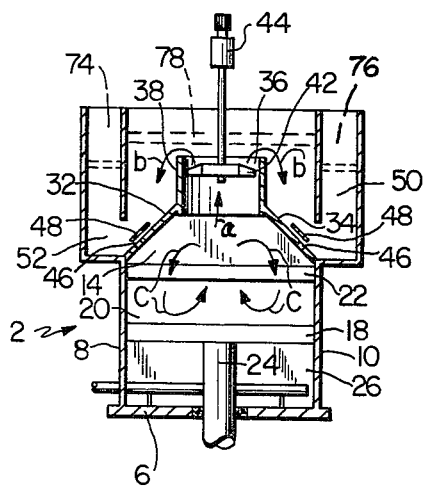
FIGS. 3 and 4 are cross-sectional views taken respectively along lines III—III and IV—IV of FIG. 2.
Figure 4:
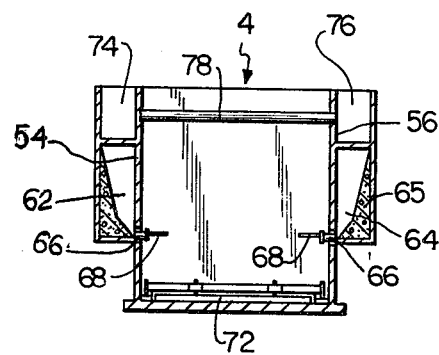

The upper portion of reaction zone 2 is separated from the lower portion thereof by means of a pair of longitudinally extended inclined walls 32 and 34, as shown in FIG. 3. A central passage 36 extends through walls 32 and 34 and connects the upper portion of reaction zone 2 with the lower portion thereof. Central passage 36 may be defined in any suitable manner. In the illustrated embodiment, central passage 36 is formed as a cylindrical opening extending through a block 38 formed of a fill material such as concrete and supported on a horizontal plate 40. It is to be understood however that central passage 36 could be formed in any convenient suitable manner which will be apparent to those skilled in the art. For example, central passage 36 could be defined by a cylindrical metal tube.

Within the upper portion of central passage 36 there is positioned an impeller or pump 42, which may for example be a screw, a turbine or a propeller. Impeller 42 is connected to and supported by suitable drive means 44, shown schematically in FIG. 3.

The purpose of impeller 42 is to create a turbulent mixture of incoming water to be treated from inlet pipe 24 and sludge. Specifically, impeller 42 creates a turbulent mixture of water and sludge within a turbulent area filling the lower portion of the reaction zone 2 and continuing upwardly to the top of central passage 36. The turbulent mixture of water and sludge passes through the top of central passage 36, as shown by arrow $a$ in FIG. 3, and then passes downwardly over opposite lateral sides of block 38, as shown by arrows $b$ in FIG. 3. Impeller 42 also creates a turbulent flow of water and sludge within the lower portion of reaction zone 2, i.e. within the turbulent area therein, as shown by arrows $c$ in FIG. 3.

In the upper portion of reaction zone 2 the flow of water and sludge is divided into two separate flows. A first flow returns into the turbulent area in the lower portion of reaction zone 2 through openings 46 in walls 32 and 34. This flow is a recirculation flow, and the quantity thereof may be adjusted by means of movable adjustment plates or covers 48. The second flow of water and sludge passes into chambers 50 and 52 which are defined in opposite lateral sides of the upper portion of reaction zone 2.

Figure 1:
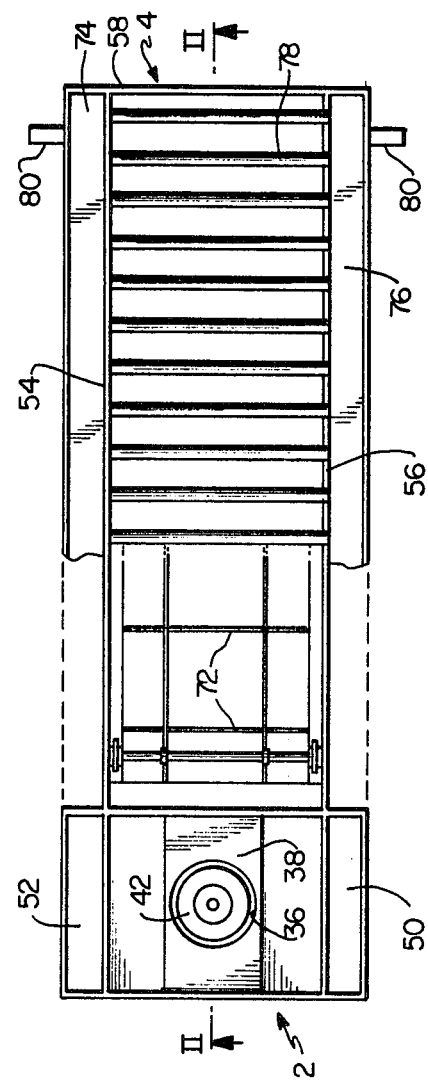
FIG. 1 is a plan view of one specific preferred embodiment of the present invention.

Decanting or clarification zone 4 is generally rectangular and extends longitudinally from reaction zone 2, i.e. in a direction to the right of reaction zone 2 as shown in FIGS. 1 and 2 of the drawings. Decanting zone 4 is defined by bottom wall 16 which inclines slightly toward reaction zone 2, by opposite side walls 54 and 56 and by end wall 58. Within the decanting chamber thereby formed in decanting zone 4 are provided a plurality of parallel inclined plates 60 to accelerate upward movement of purified water and downward movement of settling sludge. The operation and structural parameters of parallel plates 60 are known in the decanting art, and in and of themselves do not form the inventive concept. Plates 60 are shown only in FIG. 2, and are not shown in the other Figures, for purposes of clarity of illustration.

Reaction zone 2 and decanting zone 4 are included in a single unit or structure. That is, wall 8 is contiguous with wall 54, wall 10 is contiguous with wall 56, walls 12 and 58 are opposite end walls of the entire structure, and the bottom wall of the entire structure is formed by 6, 18 and 16.

Extending longitudinally of decanting zone 4, on opposite sides thereof, are ducts 62 and 64 which communicate at the ends thereof adjacent the reaction zone 2 with reaction zone chambers 52 and 50, respectively. The portion of the sludge-water mixture which passes into chambers 50 and 52, i.e. that portion which is not recirculated through openings 46, passes longitudinally into ducts 64 and 62, respectively. Inclined fill blocks 65 extend longitudinally throughout the length of ducts 62 and 64 to ensure that ducts 62 and 64 incline downwardly and inwardly toward decanting zone 4. Fill blocks 65 in the illustrated embodiment are shown as being formed by a concrete type material. However, it will be apparent that fill blocks 65 may be formed by other suitable materials. Furthermore, ducts 62 and 64 may be defined by side and bottom walls which ensure a downward and inward inclination. This downward and inward inclination of ducts 62 and 64 avoids the formation of solid deposits therein, such as would be caused by settling sludge. This downward and inward inclination also operates to help regulate the speed of that portion of the flow passing through ducts 62 and 64.

At the bottom of ducts 62 and 64 there are provided a plurality of openings or orifices 66 which extend through walls 54 and 56. Openings 66 are spaced along the entire longitudinal length of walls 54 and 56, as shown in FIG. 2. Thus, the mixture of water and sludge from each of ducts 62 and 64 is passed inwardly to the decanting zone 4 through openings 66. Due to the spacing of openings 66 along the entire length of the decanting zone, the mixture of water and sludge is uniformly spaced throughout the entire length of the decanting zone 4. Each opening 66 may be provided, within decanting zone 4, with an adjustable deflector 68 for precisely directing and aligning the direction of flow of the mixture of water and sludge into the decanting zone 4.

The mixture of water and sludge enters decanting zone 4 through openings 66, and is aligned and directed by deflectors 68, and then passes upwardly through decanting zone 4. Inclined parallel plates 60 operate to ensure a laminar flow and also accelerate upward movement of the purified water and downward movement of the settling sludge.

The settling sludge settles in the bottom area 70 of the decanting zone 4. The decanting zone may be provided with means for returning this settled sludge to the lower portion, i.e. the turbulent area, of the reaction zone 2. In the illustrated embodiment, and as particularly illustrated in FIGS. 2 and 4 of the drawings, this sludge return means may be in the form of an endless conveyor provided in the bottom of decanting zone 4. Such endless conveyor may be of the chain or belt type and has a plurality of pusher or scraper blades 72 which operate to discharge settled sludge from area 70 through opening 20 into the bottom of reaction zone 2.

Located above ducts 62 and 64, and extending longitudinally on opposite sides of decanting zone 4, are a pair of purified water collecting channels 74 and 76, respectively. Water which is purified after passing upwardly through decanting zone 4 is passed into channels 74 and 76 via perforated pipes 78 which extend between channels 74 and 76 and which are spaced along the entire length of the decanting zone 4. For purposes of clarity of illustration, perforated pipes 78 have been shown in the right-hand portion only of the decanting zone 4 in FIG. 1. Similarly, for purposes of clarity of illustration, the left-hand portion of decanting zone 4 in FIG. 1 shows only the endless conveyor including scraping blades 72 for removing collected settled sludge from the bottom of decanting zone 4 to the reaction zone 2.

Purified water collecting channels 74 and 76 have suitable purified water discharge means, such as pipes 80 shown schematically in FIG. 1.

The operation of the embodiment of the device of the present invention illustrated in FIGS. 1-4 will now be described.

Liquid to be treated, such as raw water is introduced through inlet pipe 24. The water receives chemical reaction substances in a known manner to achieve an effective mixture with the water, either prior to entry into reaction zone 2 or after entry therein. Impeller 42 creates in the lower portion or turbulent area of reaction zone 2 a turbulent mixture of sludge and water. Specifically, impeller 42 is designed to achieve a flow rate through central passage 36 several times higher than the rate at which water is introduced into reaction zone 2 through inlet pipe 24. The turbulence within the lower portion of reaction zone 2 caused by the operation of impeller 42 and by the recirculation of a portion of the flow through openings 46 causes a very violent mixing, thereby thoroughly mixing the water, sludge and chemical reagents added to the water. This very strong turbulence operates to prevent direct passage of the water from pipe 24 to central passage 36, as particularly shown by arrows c in FIG. 3. Drive 44 is preferably adjustable so that the speed of impeller 42, and therefore the rate of flow through central passage 36, may be adjusted. The amount of recirculation flow through openings 46 may be adjusted by plates or covers 48.

That portion of the flow which passes through central passage 36 and which is not recirculated into the turbulent lower area of reaction zone 2 is passed through chambers 52 and 50 into ducts 62 and 64, respectively. The flow mixture of water, chemical reagents and sludge is distributed uniformly into the lower portion of decanting zone 4 through openings 66. That is, by the arrangement of the present invention it is possible to uniformly distribute the mixture of water and sludge beneath the decanting area, and specifically to distribute the mixture into the spaces beneath each adjacent pair of plates 60. This is particularly advantageously achieved when each of the spaces between adjacent plates 60 has flow directed thereto by specific openings 66, as shown in FIG. 2.

The water is decanted or clarified during passage upwardly through the decanting zone 4, as sludge simultaneously settles downwardly. The purified water then passes through perforated pipes 78 into collection channels 74 and 76.

Settled sludge which is returned from the bottom of decanting zone 4 into the reaction zone 2 by means of scraper blades 72 becomes again turbulently mixed with newly entering water and chemical reagents within the turbulent area in the bottom of reaction zone 2. Therefore, it is possible to maintain a necessary sludge concentration within the turbulent area of the reaction zone. Any excess sludge is collected in troughs or pits 28 and may be periodically removed by pipes 30.

By the above arrangement, and specifically due to the action of impeller 42 it is possible to greatly reduce the surface area of the decanting zone while increasing the quantity of water being decanted. It is also possible to uniformly distribute the mixture of water and sludge throughout the entire area of the bottom of the decanting zone.

Specifically, in the case of a crystalline-precipitation treatment, for example, it is possible to maintain a relatively high sludge concentration on the order of 10 to 20 g/liter, such concentration preventing any short circuiting of the water flow to be treated, and such concentration may be achieved by providing that the water stays in the turbulent area of the reaction zone only from two to three minutes. Further, the mixture of water and sludge is fed to the decanting zone in such relatively high sludge concentrations, even if the precipitation reaction of the chemical reagents is not completed within the reaction zone. Such precipitation reaction may be completed in ducts 62 and 64. The relatively high sludge concentration throughout the decanting zone will avoid any risk of metal salt incrustation occurring within the apparatus. Thus, openings 66 will not be clogged by incrustation, and thus it is possible to continuously maintain the uniform flow of the mixture into the entire length and area of the decanting zone.

Additionally, by maintaining such sludge concentrations, incrustation on parallel plates 60 will be prevented, thereby ensuring the maintenance of the advantageous accelerated decanting operation.

In accordance with the present invention, and specifically by being able to supply controlled relatively high amounts of a mixture having relatively high sludge concentrations uniformly throughout the entire area of the bottom of the decanting zone, it is possible to increase the speed of the decanting or clarification operation by three to four, or even more, times that possible in standard previously known systems.

In accordance with the present invention it is possible to achieve a uniform distribution of the mixture of water and sludge into the entire area of the bottom of the decanting zone over wide variations in flow rate of water to be treated into the apparatus in relation to the designed nominal flow rate of such apparatus. That is, a given water treatment apparatus will be designed at a nominal flow rate to achieve a particular decanting speed. In the past, the operation of an apparatus at a speed less than the nominal flow rate would cause incrustations throughout the machine, thereby seriously impeding the efficiency of the decanting operation. Further, in the past, the operation of a given water treatment apparatus at less than its nominal flow rate resulted in a reduction of fluid pressure within the system sufficient to make uniform decanting extremely difficult.

However, in accordance with the present invention it is possible to operate a given water treatment apparatus at speeds substantially less than the designed nominal flow rate, while avoiding the problem of incrustation and while maintaining sufficient fluid pressure within the system to achieve efficient decanting.

Specifically, by operating impeller 42 such that the flow through central passage 36 is several, e.g. three or four or even more, times the flow of water being introduced through pipe 24, it is possible to create a thorough and relatively high concentration of sludge in the mixture. It is further possible to pass a relatively high quantity of mixture into ducts 62 and 64. Therefore, it is possible to maintain a relatively high fluid pressure within ducts 62 and 64, and therefore within the decanting zone 4. It is also thus possible to maintain a relatively high sludge concentration within ducts 62 and 64 and within decanting zone 4, and to thereby avoid the previous problem of incrustation.

The following Examples will illustrate the above features and the unique operational advantages of the present invention.

EXAMPLE 1

Water to be treated is introduced into reaction zone 2 through inlet pipe 24 at a rate equal to the designed nominal flow rate of the given installation. Impeller 42 is operated at a speed to create a turbulent mixture of water and sludge within the lower portion of reaction zone 2 and to pass a quantity of such mixture through central passage 36 equal to four times the quantity of water being introduced through inlet pipe 24. Plates or covers 48 are adjusted such that a quantity of the mixture equal to twice the amount of water being introduced through inlet pipe 24 is recirculated back into the turbulent area of the reaction zone. Therefore, the quantity of the mixture of water and sludge which is passed into ducts 62 and 64 is twice the quantity of water introduced through inlet pipe 24. Similarly, this quantity, twice the quantity introduced through inlet pipe 24, is passed through openings 66 and distributed uniformly into the bottom of the decanting zone 4. A quantity of sludge equal to the quantity of water introduced into the inlet pipe 24 settles to the bottom 70 of the decanting zone 4 and is returned to the reaction zone 2 through opening 20 by scraper blades 72. The quantity of purified water discharged from the decanting zone 4 into channels 74 and 76 equals the amount of water introduced through inlet pipe 24.

Thus, when operating a given apparatus at its nominal flow rate, it is possible to maintain a relatively high concentration of sludge due to the turbulent effect of impeller 42 and due to the recirculation achieved through openings 46. Thus, incrustation within the installation is avoided. It is also possible due to the flow magnifying action of impeller 42 to pass increased quantities of the sludge-water mixture into the bottom of the decanting area. Specifically, without the arrangement of impeller 42 and the resultant increased flow quantities attributable thereto, the flow of sludge-water mixture to the bottom of decanting zone 4 would be much less than the quantities which are possible in accordance with the present invention.

EXAMPLE 2

Assume in this Example that water to be treated is introduced into the reaction zone 2 through inlet pipe 24 at a rate equal only to one-half the designed nominal flow rate of the installation. Assume still however that impeller 42 is set to operate at a speed such that the rate of mixture of water and sludge which passes through central passage 36 is four times the designed nominal flow rate of the installation. Assume that one-half of this flow, i.e. at a rate of twice the designed nominal flow rate, is recirculated into the turbulent area through openings 46, and that the other half of this mixture, i.e. at a rate of twice the designed nominal flow rate of the apparatus, is passed into the bottom of the decanting zone through ducts 62 and 64 and openings 66. The quantity of purified water collected in channels 74 and 76 equals one-half the designed nominal flow rate, and collected settling sludge that is returned to reaction zone 2 through opening 20 equals one and one-half times the designed nominal flow rate.

Accordingly, in accordance with the present invention, even though the quantity of water being treated is only one-half the designed nominal flow rate of the given installation, the quantity of mixture of water and sludge which is introduced into the bottom of the decanting zone is still of an amount sufficient to maintain fluid pressures required to achieve an efficient decanting operation and to distribute the mixture throughout the entire bottom area of the decanting zone. Further, the quantities of sludge in the mixture to maintain this flow facilitate the prevention of incrustation.

EXAMPLE 3

In this Example water to be treated is introduced into the reaction zone through inlet pipe 24 at a rate also equal to only one-half of the designed nominal flow rate of the installation. However, in this Example impeller 42 is operated at a speed sufficient to achieve a flow through central passage 36 equal to three times the designed nominal flow rate. One-half of this flow is recirculated to the turbulent area of the reaction zone through openings 46, and the other half of this flow is passed through ducts 62 and 64 and openings 66 into the bottom of the decanting zone 4. In other words, a mixture of water and sludge equal to one and one-half times the designed nominal flow rate of the installation is introduced into the bottom of the decanting zone 4. The quantity of purified water collected in channels 74 and 76 is of course equal to one-half the designed nominal flow rate of the installation. The quantity of sludge collected in the bottom of the decanting zone and returned to the reaction zone through opening 20 equals the designed nominal flow rate of the installation.

However, in this Example also, even though the installation is operated to treat water at a rate of only one-half the designed nominal rate of flow, by the operation of impeller 42 it is still possible to maintain sufficient fluid pressure in ducts 62 and 64 and within the decanting zone to achieve an efficient decanting operation. Furthermore, the increased quantities of sludge in the mixture to achieve this pressure prevent incrustation.

The advantages of the system of the present invention are apparent when considering the above Examples. Specifically, by a comparison of Examples 1, 2 and 3, it can be ascertained that the fluid pressure within the decanting portion of the apparatus can be maintained sufficient to achieve efficient decanting, even when the installation operates at only one-half the designed nominal flow rate. That is, if a given installation is designed to operate at a fluid pressure drop of 10 centimeters of water throughout the distribution system at full nominal flow rate, under prior art systems which do not employ the present invention, the use of such an installation to treat water at only half the designed nominal flow rate would result in a drop in fluid pressure throughout the distribution system to approximately only two and one-half centimeters of water. Thus, the fluid pressure in the distribution system would be insufficient to achieve efficient decanting, i.e. it would not be possible to achieve uniform mixture distribution throughout the entire area of the decanting zone.

However, in accordance with the present invention the operation of impeller 42 prevents such a low operating pressure. Specifically, in Example 2 above, pressure in the distribution system to the decanting portion of the installation is maintained high, even though the installation is employed to treat water at a rate of only one-half the designed nominal flow rate.

Even in the example of FIG. 3, the drop in fluid pressure within the distribution system is still approximately 5.6 centimeters of water, even when the installation is employed to treat water at a rate of only one-half the nominal flow rate. Therefore, the fluid pressure within the system operated in accordance with Example 3, when the designed fluid pressure under full nominal flow rate operation would be approximately 10 centimeters of water, would still provide sufficient fluid pressure to achieve uniform distribution into the entire area of a decanter having a length of up to 20 meters.

Further, it will be apparent from a consideration of the above three Examples that the system of the present invention maintains a sufficiently high velocity of the mixture through the ducts 62 and 64 and into the decanting zone 4. Specifically, in a standard apparatus which does not include the present invention, when a given installation is operated at one-half its nominal flow rate, the velocity of the fluid being distributed to the decanting zone would be reduced by one-half. However, as will be apparent from Example 2, the velocity of the mixture introduced into the decanting zone in accordance with the present invention may be maintained at full velocity, even when the installation is employed to treat water at one-half the nominal flow rate. Even in the example of FIG. 3, the velocity is reduced by only one-third.

An additional feature of the present invention is that the arrangement may be used to develop various modular constructions much more readily than previously known systems. This is advantageous in facilitating improved and simplified construction, and also overcoming problems which are encountered when a given water treatment location must accommodate increases in flow.

Figure 5:
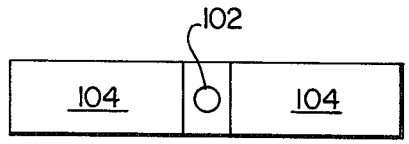
FIG. 5 is a plan view schematically illustrating an installation employing the system of FIG. 1, but modified to include two decanting or clarification areas.

For example, as shown schematically in FIG. 5, a single reaction zone 102 may be designed to accommodate two laterally adjacent decanting zones 104. Accordingly, the nominal flow rate of the overall installation may be doubled, without the necessity of providing an additional reaction zone.

Figure 6:
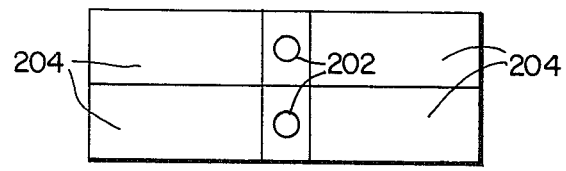
FIG. 6 is a plan view schematically illustrating an installation employing two assemblies, arranged side by side, of the type shown in FIG. 5.

Further, in the overall installation schematically shown in FIG. 6, a pair of units such as shown in FIG. 5 may be placed side to side so that the overall nominal flow rate of the installation may be increased by four times, while necessitating the provision of only two reaction zones. That is, in the arrangement of FIG. 6 two installations, each including a single reaction zone 202 and two decanting zones 204 may be tandemly provided.

Further advantages of the system of the present invention will be apparent from the following practical illustration of the present invention.

Specifically, comparative tests were made in an installation constructed in accordance with the present invention and in a standard sludge-recycling installation. Both installations were operated to provide a lime-type decarbonization treatment of water. The water to be treated contained calcium bicarbonate and magnesium bicarbonate of 30 French degrees and 50 mg/l matter and suspension. The flow rate of water entering each installation was 2600 $m^3$ per hour.

The respective installations had the following dimensions:

|  | Apparatus of the invention, 38.5 × 5 m | Standard apparatus, diameter 23.5 m |
|---|---|---|
| ground surface | $192.5^2$ | 435 $m^2$ |
| height | 5.25 m | 5 m |
| total volume | 1,000 $m^3$ | 2,150 $m^3$ |
| volume of the reaction zone | 130 $m^3$ | 130 $m^3$ |
| surface of the decanting zone | 170 $m^2$ | 400 $m^2$ |

In the installation in accordance with the present invention, the decanting velocity was 15.2 m/h. However, in the standard installation, the decanting velocity was merely 6 m/h.

The treated water obtained from each of the two installations had the same characteristics and properties, i.e. a total alkalinity of 3°–4° and a suspended matter content of 3–5 mg/l.

From the above table it will be apparent that to obtain the same quality of treated water, the decanting velocity achievable in the installation of the present invention was more than twice that of the standard installation, while the volumes of the reaction zones were equal, but even though the surface area of the decanting zone of the installation of the present invention was less than half that of the standard installation. In other words, the total ground or surface area necessary to accommodate the standard installation was more than twice that necessary to accommodate the installation in accordance with the present invention, even though the quality of water treated by the two installations was equal, and even though the decanting velocity of the present invention was more than twice that of the standard apparatus.

It should be readily apparent from the above considerations that the system of the present invention provides remarkable advantages in cost and space savings as compared with standard and previously known installations.

Furthermore, from the above discussion, and specifically the three above Examples, it should be readily apparent that in accordance with the present invention the flexibility of operation of the water treatment installation is greatly improved by employing the concept of the present invention.

Furthermore, in accordance with the present invention it is possible to achieve a much more rapid mixing of the water, sludge and possible chemical reagents necessary to achieve a crystallization or flocculation treatment.

It is to be understood that although the majority of the mixing and reaction occurs in the reaction zone 2, it is possible to design and employ a system wherein the reaction continues in other areas or portions of the installation, such as for example in ducts 62 and 64.

It is further to be specifically understood that the present invention is not limited to the type of decanting zone illustrated. Rather, the concept of the present invention may be employed in other known types of decanting structures, such as sludge bed, pulsating, non-pulsating, sludge-contact, laminar, or non-laminar decanting installations.

Further, the concept of the present invention is not limited to a reaction zone and/or decanting zone constructed in the specific illustrated and described manner. Rather, both the reaction zone and decanting zone may be constructed in other manners and by other means which would be apparent to those skilled in the art, while still encompassing the inventive concept of the present invention, i.e. the achieving of a rapid sludge and water mixing of a controllably high sludge concentration and the distribution of such mixture in a uniform manner throughout the entire area of the bottom of the decanting zone, even at rates of water treatment remarkably reduced from designed nominal flow rates.

Various other modifications may be made to the above specifically described structural arrangement without departing from the scope of the present invention.

What is claimed is:

1. A liquid treatment apparatus comprising:
    a single enclosure containing therein at least one reaction zone having therein sludge and at least one decanting zone, said reaction zone having a lower portion and an upper portion separated from said lower portion;
    means for introducing liquid to be treated into said lower portion of said reaction zone;
    means for turbulently mixing said liquid and sludge within a turbulent area of said lower portion of said reaction zone and withdrawing at a controlled rate the thus formed mixture of liquid and sludge from said turbulent area of said lower portion to said upper portion;
    means for recycling a first portion of the thus withdrawn mixture from said upper portion back into said turbulent area of said lower portion;
    means, separate from said recycling means, for distributing a second portion of said thus withdrawn mixture from said upper portion in a uniform manner throughout the entire area of the lower portion of said decanting zone, whereby purified liquid rises upwardly to the top of said decanting zone and sludge settles toward the bottom of said decanting zone; and
    means for collecting said purified liquid.

2. An apparatus as claimed in claim 1, further comprising means for returning sludge which has settled on the bottom of said decanting zone into said turbulent area of said lower portion of said reaction zone.

3. An apparatus as claimed in claim 2, wherein said decanting zone communicates along the entire width thereof through an opening with said turbulent area of said lower portion of said reaction zone, and said returning means comprises means for scraping settled sludge from the bottom of said decanting zone through said opening into said turbulent area.

4. An apparatus as claimed in claim 1, wherein said liquid introducing means comprises an inlet pipe extending into said lower portion of said reaction zone.

5. An apparatus as claimed in claim 1, wherein said upper and lower portions of said reaction zone are separated by a wall having therein a central passage, and said mixing means comprises pump means positioned within said central passage.

6. An apparatus as claimed in claim 5, wherein said pump means is a variable speed pump capable of pumping said mixture through said central passage at a desired controlled rate greater than the rate at which said liquid to be treated is introduced into said reaction zone.

7. An apparatus as claimed in claim 6, wherein said pump is capable of pumping said mixture through said central passage at a rate of three to four times the rate at which said liquid to be treated is introduced into said reaction zone.

8. An apparatus as claimed in claim 5, wherein said recycling means comprises openings in said wall on opposite sides of said central passage.

9. An apparatus as claimed in claim 8, further comprising means for adjusting the size of said openings and for thereby regulating the amount of said first portion of said mixture recycled back to said turbulent area.

10. An apparatus as claimed in claim 1, wherein said decanting zone is substantially rectangular and communicates adjacent an end thereof with said reaction zone.

11. An apparatus as claimed in claim 10, wherein said distributing means comprises ducts extending from said upper portion of said reaction zone on opposite sides of said decanting zone, exterior of said decanting zone, throughout the entire length of said decanting zone, and orifices extending from said ducts into said decanting zone, said orifices being spaced along the entire length of said decanting zone.

12. An apparatus as claimed in claim 11, further comprising means, separate from said orifices, for deflecting and aligning flow of said mixture into said decanting zone through said orifices.

13. An apparatus as claimed in claim 11, wherein said mixing means comprises pump means capable of maintaining the fluid pressure in said mixture passing through said orifices at a level sufficient to achieve a continuously uniform distribution of said mixture throughout the entire area of said decanting zone.

14. An apparatus as claimed in claim 11, further comprising parallel plates positioned within said decanting zone and spaced along the entire length thereof, said orifices being positioned to distribute said mixture uniformly into the spaces between said parallel plates.

15. An apparatus as claimed in claim 1, wherein said single enclosure has therein one reaction zone and two separate decanting zones, one each on opposite sides of said reaction zone.

16. An apparatus as claimed in claim 1, wherein said single enclosure has therein two reaction zones and four separate decanting zones, each said reaction zone having on each opposite side thereof one said decanting zone.

17. A method for treating liquid in an apparatus of the type including a single enclosure containing therein at least one reaction zone having therein sludge and at least one decanting zone, said reaction zone having a lower portion and an upper portion separated from said lower portion, said method comprising:
    introducing liquid to be treated into said lower portion of said reaction zone;
    turbulently mixing said liuqid with said sludge in a turbulent area of said lower portion of said reaction zone and withdrawing at a controlled rate the thus formed mixture of liquid and sludge from said turbulent area of said lower portion to said upper portion;

recycling a first portion of the thus withdrawn mixture from said upper portion back into said turbulent area of said lower portion;

distributing, through means separate from the means of said step of recycling, a second portion of said thus withdrawn mixture from said upper portion in a uniform manner throughout the entire area of the lower portion of said decanting zone, whereby purified liquid rises upwardly to the top of said decanting zone and sludge settles toward the bottom of said decanting zone;

collecting said purified liquid.

18. A method as claimed in claim 17, wherein the quantity of said second portion of said withdrawn mixture which is distributed to said decanting zone is greater than the quantity of said liquid supplied to said lower portion of said reaction zone.

19. A method as claimed in claim 17, further comprising returning sludge which has settled on the bottom of said decanting zone into said lower portion of said reaction zone.

20. A method as claimed in claim 17, wherein said mixture is withdrawn from said turbulent area of said lower portion of said reaction zone at a desired controlled rate greater than the rate at which said liquid to be treated is introduced into said reaction zone.

21. A method as claimed in claim 20, wherein said desired controlled rate is three to four times the rate at which said liquid to be treated is introduced into said reaction zone.

22. A method as claimed in claim 17, further comprising regulating the amount of said first portion of said mixture recycled back to said turbulent area.

23. A method as claimed in claim 17, further comprising directing, by the use of means separate from said orifices, the direction of flow of said second portion of said mixture which is distributed to said decanting zone.

24. A method as claimed in claim 17, further comprising controlling the fluid pressure of said second portion of said mixture distributed to said decanting zone.

25. A liquid treatment apparatus comprising:

a single enclosure containing therein at least one reaction zone having therein sludge and at least one decanting zone, said reaction zone having therein a turbulent area defined by a wall having a central passage, and said decanting zone communicating along the entire width thereof through an opening with said turbulent area of said reaction zone;

means for introducing liquid to be treated into said reaction zone;

means, positioned within said central passage, for turbulently mixing said liquid and sludge within said turbulent area and for withdrawing at a controlled rate the thus formed mixture of liquid and sludge from said turbulent area through said central passage;

openings provided in said wall on opposite sides of said central passage, said openings forming means for recycling a first portion of the thus withdrawn mixture back into said turbulent area;

means for adjusting the size of said openings and for thereby regulating the amount of said first portion of said mixture recycled back to said turbulent area;

means for distributing a second portion of said thus withdrawn mixture in a uniform manner throughout the entire area of the lower portion of said decanting zone, whereby purified liquid rises upwardly to the top of said decanting zone and sludge settles toward the bottom of said decanting zone; and means for collecting said purified liquid.

26. An apparatus as claimed in claim 25, further comprising means for returning sludge which has settled on the bottom of said decanting zone into said turbulent area of said reaction zone.

27. An apparatus as claimed in claim 26, wherein said returning means comprises means for scraping settled sludge from the bottom of said decanting zone through said opening into said turbulent area.

28. An apparatus as claimed in claim 25, wherein said liquid introducing means comprises an inlet pipe extending into the bottom of said reaction zone.

29. An apparatus as claimed in claim 25, wherein said mixing means is a variable speed pump capable of pumping said mixture through said central passage at a desired controlled rate greater than the rate at which said liquid to be treated is introduced into said reaction zone.

30. An apparatus as claimed in claim 29, wherein said pump is capable of pumping said mixture through said central passage at a rate of three to four times the rate at which said liquid to be treated is introduced into said reaction zone.

31. An apparatus as claimed in claim 25, wherein said decanting zone is substantially rectangular and communicates adjacent an end thereof with said reaction zone.

32. An apparatus as claimed in claim 31, wherein said distributing means comprises ducts extending from said reaction zone on opposite sides of said decantng zone, exterior of said decanting zone, throughout the entire length of said decanting zone, and orifices extending from said ducts into said decanting zone, said orifices being spaced along the entire length of said decanting zone.

33. An apparatus as claimed in claim 32, further comprising means, separate from said orifices, for deflecting and aligning flow of said mixture into said decanting zone through said orifices.

34. An apparatus as claimed in claim 32, wherein said mixing means comprises pump means capable of maintaining the fluid pressure in said mixture passing through said orifices at a level sufficient to achieve a continuously uniform distribution of said mixture throughout the entire area of said decanting zone.

35. An apparatus as claimed in claim 32, further comprising parallel plates positioned within said decanting zone and spaced along the entire length thereof, said orifices being positioned to distribute said mixture uniformly into the spaces between said parallel plates.

36. An apparatus as claimed in claim 25, wherein said single enclosure has therein one reaction zone and two separate decanting zones, one each on opposite sides of said reaction zone.

37. An apparatus as claimed in claim 25, wherein said single enclosure has therein two reaction zones and four separate decanting zones, each said reaction zone having on each opposite side thereof one said decanting zone.

38. A method for treating liquid in an apparatus of the type including a single enclosure containing therein at least one reaction zone having therein sludge and at least one decanting zone, said method comprising:

introducing liquid to be treated into said reaction zone;

turbulently mixing said liquid with said sludge in a turbulent area of said reaction zone and withdrawing the thus formed mixture of liquid and sludge from said turbulent area at a controlled rate;

recycling a first portion of the thus withdrawn mixture back into said turbulent area;

distributing a second portion of said thus withdrawn mixture in a uniform manner throughout the entire area of the lower portion of said decanting zone, whereby purified liquid rises upwardly to the top of said decanting zone and sludge settles toward the bottom of said decanting zone;

controlling said steps of mixing and recycling such that, regardless of the quantity of liquid introduced into said reaction zone, the pressure of said second portion of said mixture is maintained at a pressure sufficient to ensure that said second portion of said mixture is distributed uniformly throughout the entire area of said decanting zone; and collecting said purified liquid.

39. A method as claimed in claim 38, wherein the quantity of said second portion of said withdrawn mixture which is distributed to said decanting zone is greater than the quantity of said liquid supplied to said reaction zone.

40. A method as claimed in claim 38, further comprising returning sludge which has settled on the bottom of said decanting zone into said turbulent area of said reaction zone.

41. A method as claimed in claim 38, wherein said mixture is withdrawn from said turbulent area of said reaction zone at a desired controlled rate greater than the rate at which said liquid to be treated is introduced into said reaction zone.

42. A method as claimed in claim 41, wherein said desired controlled rate is three to four times the rate at which said liquid to be treated is introduced into said reaction zone.

43. A method as claimed in claim 38, further comprising regulating the amount of said first portion of said mixture recycled back to said turbulent area.

44. A method as claimed in claim 38, further comprising directing, by the use of means separate from said orifices, the direction of flow of said second portion of said mixture which is distributed to said decanting zone.

* * * * *